United States Patent [19]

Feikema

[11] Patent Number: 5,316,360
[45] Date of Patent: May 31, 1994

[54] AUTOMOBILE SUN VISOR

[76] Inventor: Orville A. Feikema, 6805 Riverview Blvd. W., Bradenton, Fla. 34209

[21] Appl. No.: 1,385

[22] Filed: Jan. 5, 1993

[51] Int. Cl.⁵ .............................................. B60J 3/00
[52] U.S. Cl. .................................................. 296/97.3
[58] Field of Search ...................... 296/97.1, 97.2, 97.3

[56] References Cited

U.S. PATENT DOCUMENTS

| | | | |
|---|---|---|---|
| 2,118,198 | 5/1938 | Hathaway | 296/97.3 |
| 2,810,604 | 10/1957 | Francis | 296/97.3 |
| 4,362,330 | 12/1982 | Cramer | 296/97.3 |
| 4,726,620 | 2/1988 | Takahashi | 296/97.3 |

Primary Examiner—Robert R. Song
Attorney, Agent, or Firm—Charles J. Prescott

[57] ABSTRACT

An automotive sun visor including a visor member pivotably connectable adjacent a vehicle windshield and having a single viewing aperture defined by a frame connected around the perimeter of a hole formed through the visor member. The viewing aperture is positioned centrally nearer to the pivoted margin of the visor member and sized to allow the driver of the vehicle to observe a traffic signal through the viewing aperture. Various modification to the frame and the shape of the viewing aperture are also provided to further block observance of bright sunlight around a traffic signal.

9 Claims, 2 Drawing Sheets

AUTOMOBILE SUN VISOR

BACKGROUND OF THE INVENTION

1. Field of the Invention

This invention relates generally to vehicle components, and more particularly to an improved driver's side sun visor structured to allow the driver of the vehicle to observe a traffic light signal as when at a standstill therefor absent sunlight glare.

2. Description of Prior Art

Virtually all motor vehicles are equipped with at least a driver's side sun visor which is pivotally connected along an upper longitudinal margin thereof adjacent the windshield of the vehicle. In its pivoted downward in-use position, the sun visor generally blocks a portion of incoming sunlight entering the vehicle through the front windshield, while simultaneously reducing the area for viewing oncoming sky and sunlight and traffic signals.

In most instances, the presence of the sun visor in its downwardly in-use position does not obstruct any useful traffic visibility required by the driver. However, overhead traffic light signals, especially as the vehicle approaches or is stopped at an intersection, may become obscured from the driver's line of sight when the sun visor is in use.

In such situations, the driver must bend forwardly so as to facilitate line of sight with the traffic signal or pivot the visor into its upper stored position. In such situations, however, this may subject the driver's eyes to the very bright sunlight which the sun visor is otherwise blocking.

In extreme circumstances such as during morning and evening commuter traffic, this deficiency is quite acute, leaving the driver to either be temporarily "sun blind" to view a traffic signal or to simply hope for the best by observing movement of adjacent traffic.

A number of devices in prior art have attempted to address this problem by either modifying or adding to existing sun visors in a fashion which restricts or blocks the amount of sunlight which is able to be viewed by the driver passing through the windshield.

Cramer, in U.S. Pat. No. 4,362,330 teaches a see-through automobile sun visor which includes a plurality of spaced slots formed through the visor member which may be made viewable therethrough or blocked based upon the selective positioning of a separate movable slotted member. However, the complexity of this device, coupled with the range of selective adjustability, tends to render this invention somewhat impractical.

A sun visor for automobiles is disclosed in U.S. Pat. No. 4,512,605 invented by Aschermann which teaches a sun visor slidable along a guide rail between a stored and an in-use position without being swiveled around a bearing.

Takahashi discloses a sun visor for automobiles in U.S. Pat. No. 4,726,620 wherein a perforated sheet having at least a portion thereof a large number of fine holes therethrough which render the visor somewhat "see-through".

Takahashi has also invented another such invention as shown in U.S. Pat. No. 4,890,875 which includes a transparent sheet having a surface on which a translucent sheet is attached formed of reticulated patterns forming fine through-holes.

Masi, in U.S. Pat. No. 3,445,135, teaches a perforated sun visor as an accessory to a conventional sun visor structured to be connected along the bottom of the sun visor.

The present invention is considerably simpler in construction and mode of use and design for the express purpose of only allowing limited viewability of traffic signals in close proximity to the vehicle. Variations of the invention further limit the viewable light surrounding a traffic light so that the driver may, by side to side head and eye movement, be totally blocked from having to view bright sunlight which surrounds the field of vision of the traffic signal while still having immediate sight access to the stop signal by appropriate head and eye movement.

BRIEF SUMMARY OF THE INVENTION

This invention is directed to an automobile sun visor including a visor member pivotably connectable adjacent a vehicle windshield and having a single viewing aperture defined by a frame connected around the perimeter of a hole formed through the visor member. The viewing aperture is positioned centrally side to side and nearer to the pivoted margin of the visor member and sized to allow the driver of the vehicle, by appropriate side to side eye and head movement, to observe a traffic signal through the viewing aperture. Various modification to the frame and the shape of the viewing aperture are also provided to further block the observance of bright sunlight surrounding the traffic signal when the eye and head are suitably moved laterally.

It is therefore an object of this invention to provide an improved sun visor which facilitates the very limited scope observance therethrough for viewing a traffic signal when in close proximity thereto.

It is yet another object of this invention to provide an economical and simple to use means for limited viewing of traffic signals while otherwise blocking bright sunlight from striking the vehicle driver's eyes.

It is yet another object of this invention to allow the operator of a vehicle, when the vehicle sun visor is down in use, to readily observe and not be blocked from observing the condition of a traffic signal by appropriate side to side head and eye movement without being "sunblinded".

In accordance with these and other objects which will become apparent hereinafter, the instant invention will now be described with reference to the accompanying drawings.

DETAILED DESCRIPTION OF THE INVENTION

Figure 1:
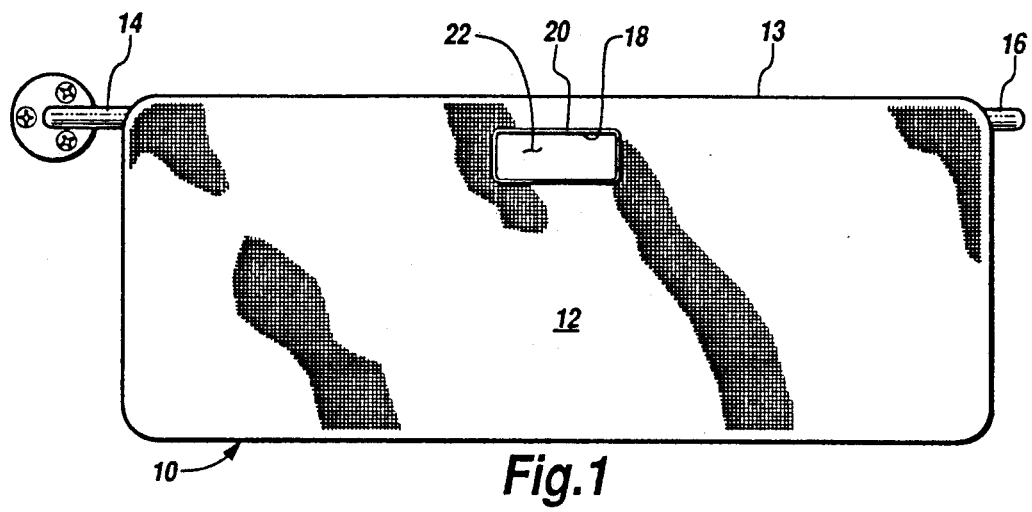
FIG. 1 is a front elevation view of the preferred embodiment of the invention.
Figure 2:
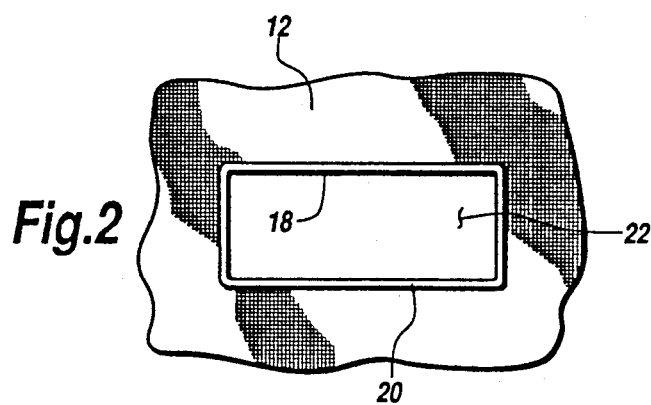
FIG. 2 is an enlarged front elevation view of the central portion of FIG. 1.

Referring now to the drawings, and particularly to FIGS. 1 and 2, the preferred embodiment of the invention is shown generally at numeral 10. This invention 10 includes a generally flat, rectangular visor member 12 which is pivotally connected between bracket 14 and pin 16 adjacent the upper margin of a windshield of a vehicle in a well-known manner. Thus, the visor member 12, when pivoted upwardly, is in its stored position and, when pivoted downwardly into its in-use position, partially blocks the viewing area of the driver of the vehicle through the windshield.

In traffic situations where the vehicle approaches a traffic signal or is at rest in response to a traffic signal at an intersection, the driver is normally not able to directly view the condition of the traffic signal so as to properly respond thereto when the visor member 12 is in its downwardly in-use position. Many times this situation occurs when the position of the sun is low as in morning and evening commuter traffic.

To view the condition of the traffic signal under these circumstances requires that the driver either bend forwardly to position his line of sight closer to the windshield or to raise the visor member 12 temporarily so as to be able to view the condition of the traffic signal. In this circumstance, the eyes of the driver are exposed to the bright sunlight which may result in temporary "sun blindness", an unfavorable driving condition.

The present invention 10 provides a relatively small rectangular frame 20 which is connected around the perimeter of a mating hole 22 formed through the visor member 12. This frame 20 is typically formed of mating two-part plastic components which interlock through the hole 22 from either side of the visor member 12.

This frame 20 defines a rectangular viewing aperture 18 which is, by the placement of hole 22, in close proximity to the pivotal margin 13 of visor member 12. The placement of viewing aperture 18 in close proximity to this pivotal margin 13 is chosen so as to facilitate minimizing the overall size of the viewing aperture 18 for its intended purpose.

The overall height of the viewing aperture 18 is thus selected so as to be generally similar to that of the observed height of a typical traffic signal as it is viewed through the viewing aperture 18 by the driver when the vehicle is in relatively close proximity to the traffic signal. Obviously, the observed size of the traffic signal through viewing aperture 18 is reduced with increased distance between vehicle and traffic signal; however, the height of the viewing aperture 18 is selected so as to allow the viewing of only the condition of the traffic signal when the vehicle is positioned closely thereto, yet while minimizing or blocking any additional light which appears through the viewing aperture 18 to the driver.

Figure 3:
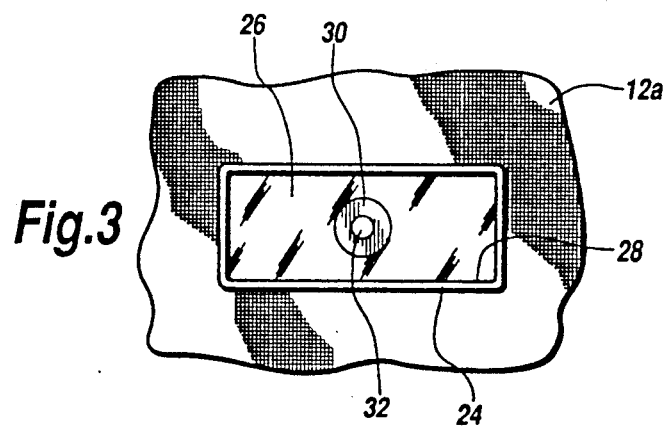
FIG. 3 is a view similar to FIG. 2 showing an alternate embodiment of the invention.

In certain circumstances of extremely bright sunlight observable around the traffic signal, the driver of the vehicle may still incur sun blindness due to the fact that the observed size of the traffic signal is smaller than the side to side dimension of the viewing aperture 18. FIG. 3 shows an alternate embodiment of the viewing aperture 28 connected within visor member 12a which provides an annular opaque ring 30 etched or painted onto a transparent sheet 26 mounted within the perimeter of viewing aperture 28. This opaque annular ring 30 defines a considerably smaller peep hole 32 centrally positioned on transparent sheet 26 so that the viewer may align only the segments of the traffic light with his or her line of sight which will advise the driver of the condition of the traffic signal. Thus, peep hole 32 is sized so as to be proportional along the line of sight between the driver's eye and a traffic signal when the vehicle is at a standstill in close proximity thereto so as to allow only viewing of one or two light segments of the traffic signal itself, all other bright background sunlight being blocked from view.

Figure 4:
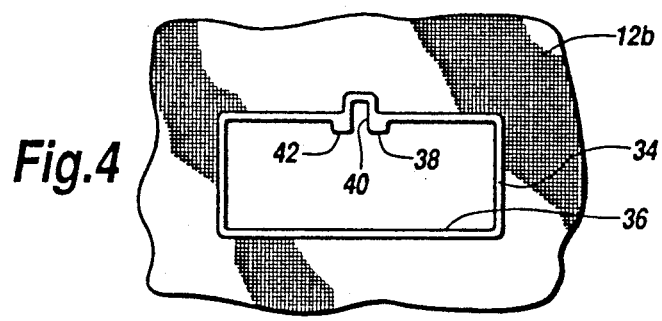
FIG. 4 is a view similar to FIG. 2 showing yet another embodiment of the invention.
Figure 8:
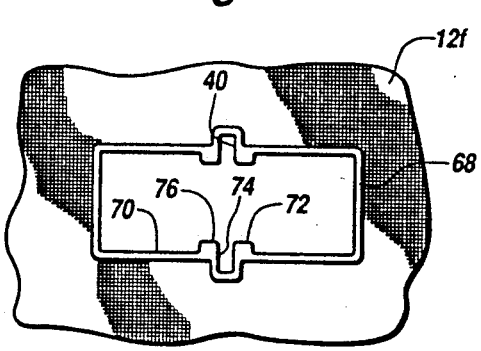
FIG. 8 is a view similar to FIG. 2 showing yet another embodiment of the invention.

In FIG. 4, yet another embodiment of a viewing aperture 36 defined by frame 34 within visor member 12b is there shown. In this frame embodiment 34 the viewing aperture 36 includes a vertical notch 40 centrally positioned along the upper horizontal margin of frame 34. Both vertical margins of the notch 40 extend downwardly at 38 and 42 below the upper margin of viewing aperture 36 so as to provide further sunlight blocking which allows viewing of only the entire traffic signal itself when the vehicle is in close proximity thereto, all other background sunlight being obliterated. In FIG. 8, a yet further enhancement of this general configuration is there shown including a lower notch 74 terminating in side portions 72 and 76 within frame 68. Thus, in this frame embodiment 68 within visor member 12f, the viewing aperture 70 includes both upper and lower notches 40 and 74 to accommodate variances in the height of the driver and the exact pivotal position of the visor 12f.

Figure 5:
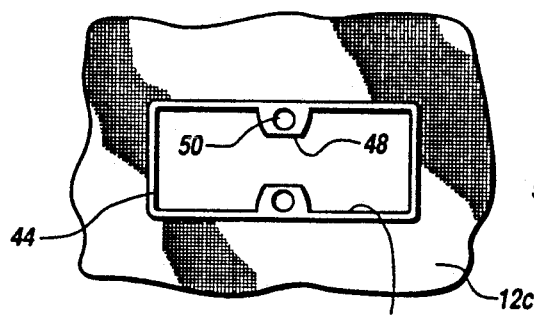
FIG. 5 is a view similar to FIG. 2 showing yet another embodiment of the invention.
Figure 6:
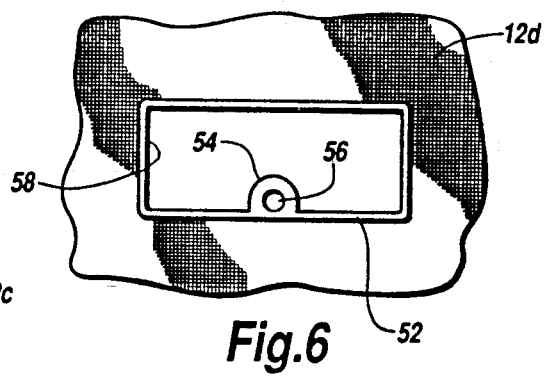
FIG. 6 is a view similar to FIG. 2 showing yet another embodiment of the invention.
Figure 7:
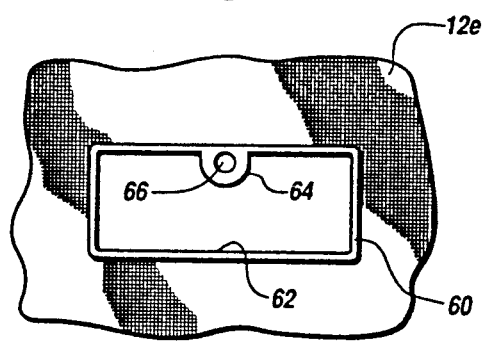
FIG. 7 is a view similar to FIG. 2 showing yet another embodiment of the invention.

Referring now to FIGS. 5, 6 and 7, three alternate embodiment of the frame at 44, 52 and 60 are there shown within visor members 12c, 12d and 12e, respectively. Each of these frames define viewing apertures 46, 58 and 62 which include light blocking portions extending into the otherwise rectangular viewing apertures as shown. Each frame 46, 52 and 60 includes opaque tab portions 48, 54, and 64 which extend into the respective viewing aperture and define peep holes 50, 56 and 66 whose size and function are similar to that described with respect to FIG. 3. These peep holes 50, 56 and 66 are thus sized so as to allow only the viewing of a small portion of a traffic signal such as one of the lights thereof, any surrounding sunlight being blocked from the driver's immediate view.

Figure 9:
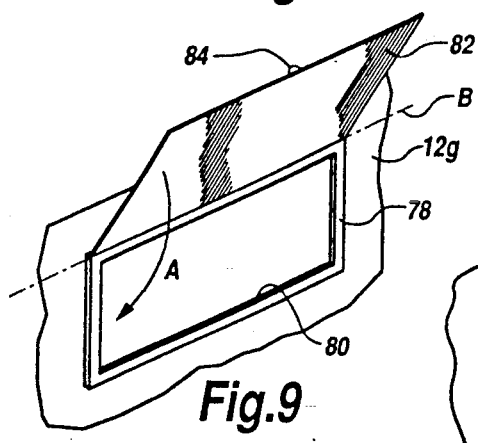
FIG. 9 is a perspective view of one embodiment of a pivotably openable cover for the viewing aperture of the invention.

Referring to FIG. 9, the driver may periodically wish to completely cover the viewing aperture such as when the sun and the viewing aperture are in direct alignment with the driver's line of sight. One embodiment of a viewing aperture cover is shown at 82 which is pivotally connected about axis B of frame 78 so that the cover, sized similar to that of the viewing aperture 80, may be pivoted downwardly in the direction of arrow A to form a complete sun block in conjunction with visor member 12g. Handle 84 facilitates reopening this pivotal cover 82. However, it should be noted that the viewing aperture cover may also be hinge connected along either upright or side margin of the viewing aperture and be within the scope of this aspect of the invention.

Figure 10:
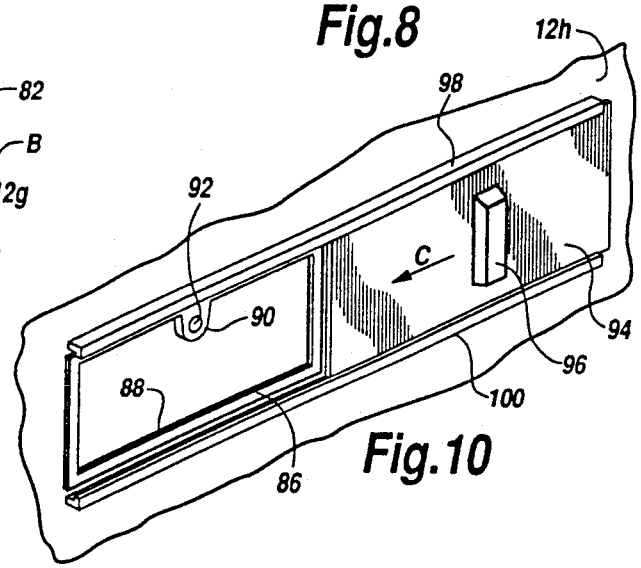
FIG. 10 is a perspective view of a slidably openable cover for the viewing aperture of the invention.

Referring to FIG. 10, an alternate embodiment of the viewing aperture 88 cover is shown at 94. This sliding cover 94 is slidably mounted within spaced parallel rails 98 and 100 which are connected to frame 86 so that the sliding cover 94, facilitated by handle 96, may be slid in the direction of arrow C so as to completely close off aperture 88. This aperture 88 includes a tab portion 90 defining a peep hole 92 sized and positioned as previously described with respect to FIGS. 3, 5, 6 and 7.

Figure 11:
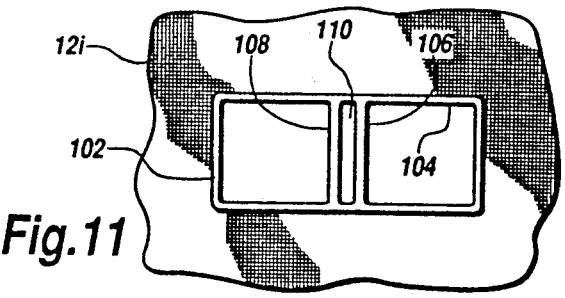
FIG. 11 is a view similar to FIG. 2 showing yet another embodiment of the invention.

Referring lastly to FIG. 11, yet another alternate embodiment of the frame 102 is there shown within visor member 12i. The frame 102 again defines a viewing aperture 104 which includes opaque light blocking portions 106 and 108 which are upright and spaced apart so as to define a narrow viewing slot 110 which fully extends vertically across viewing aperture 104 as shown. This viewing slot 110 has a width sized to provide viewing of only the entire upright portion of a traffic light itself when the vehicle is in close proximity thereto while eliminating the viewing of background sunlight which surrounds the traffic signal.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An automobile sun visor comprising:
    a generally flat and rectangular visor member having means for pivotal connection thereof adjacent a windshield of the automobile about a pivotal margin of said visor;
    said visor member including a frame connected thereto around a perimeter of a single small hole formed centrally through said visor member and positioned in close proximity to said pivotal margin, said hole having a width substantially smaller than a width of said visor member;
    said frame defining a viewing aperture sized and positioned on said visor member to allow a driver of the automobile to observe substantially only a traffic signal through said viewing aperture.

2. An automobile sun visor as set forth in claim 1, further comprising:
    a transparent panel within said frame across said viewing aperture;
    said panel including an annular shaped opaque central region defining a peep hole therewithin, said peep hole sized to permit the driver to view only the traffic signal while blocking out sunlight otherwise viewable around the traffic signal.

3. An automobile sun visor as set forth in claim 1, wherein:
    said frame includes an upright notch formed centrally into an upper margin of said frame, said notch extending away from said viewing aperture;
    said notch defined by upright edge portions of said frame which extend into said viewing aperture;
    said notch and said edges sized to permit the driver to view only the traffic signal while blocking out sunlight otherwise viewable around the traffic signal.

4. An automobile sun visor as set forth in claim 1, wherein:
    said frame includes an upright notch formed centrally into spaced upper and lower margins of said frame;
    said notches opposingly extending away from one another and away from viewing aperture;
    each said notch defined by upright edge portions of said frame which extend into said viewing aperture;
    each said notches and said edges sized to permit the driver to view only the traffic signal while blocking out sunlight otherwise appearing on either side of the traffic signal.

5. An automobile sun visor as set forth in claim 1, wherein:
    said frame includes a tab formed centrally onto an upright margin of said frame, said tab extending into said viewing aperture;
    said tab including a peep hole therethrough sized to permit the driver to view only the traffic signal while blocking out sunlight otherwise viewable around the traffic signal.

6. An automobile sun visor as set forth in claim 1, wherein:
    said frame includes a tab formed centrally into spaced upper and lower margins of said frame;
    said tabs opposingly extending toward one another and into said viewing aperture;
    each said tab including a peep hole therethrough sized to permit the driver to view only the traffic signal while blocking out sunlight otherwise viewable around the traffic signal.

7. An automobile sun visor as set forth in claim 1, further comprising:
    a flip-open cover pivotally connected along a margin of said frame and sized substantially similar to that of said viewing aperture to cover said viewing aperture when said flip-open cover is in a closed position against said frame.

8. An automobile sun visor as set forth in claim 1, wherein:
    said frame includes two spaced apart upright portions which define an upright viewing slot centrally positioned across said viewing aperture;
    said viewing slot sized in width to permit the driver to view only the traffic signal width while blocking out sunlight otherwise viewable on either side of the traffic signal.

9. An automobile sun visor as set forth in claim 1, further comprising:
    a generally flat sliding cover substantially similar in size to that of said viewing aperture and slidably mounted within spaced apart parallel rails connected to said sun visor member;
    said sliding cover slidably movable within said rails between an open position adjacent said viewing aperture and a closed position over said viewing aperture.

* * * * *